D. GARIGLIO.
AUTOMATIC COUPLING FOR ROPES, CABLES, AND THE LIKE.
APPLICATION FILED AUG. 23, 1921.
1,426,563.  Patented Aug. 22, 1922.
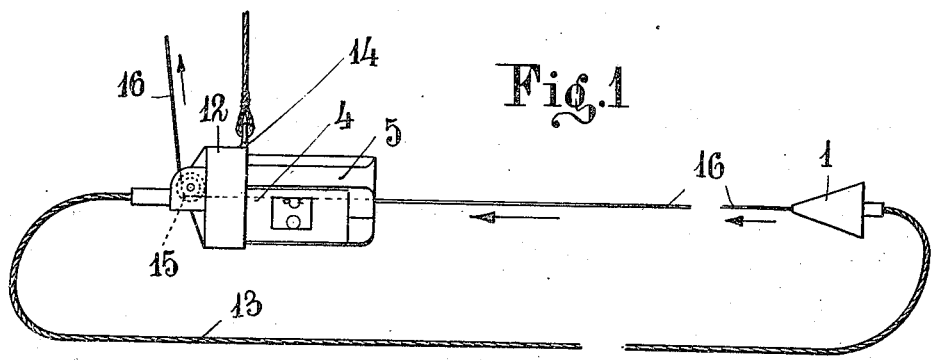
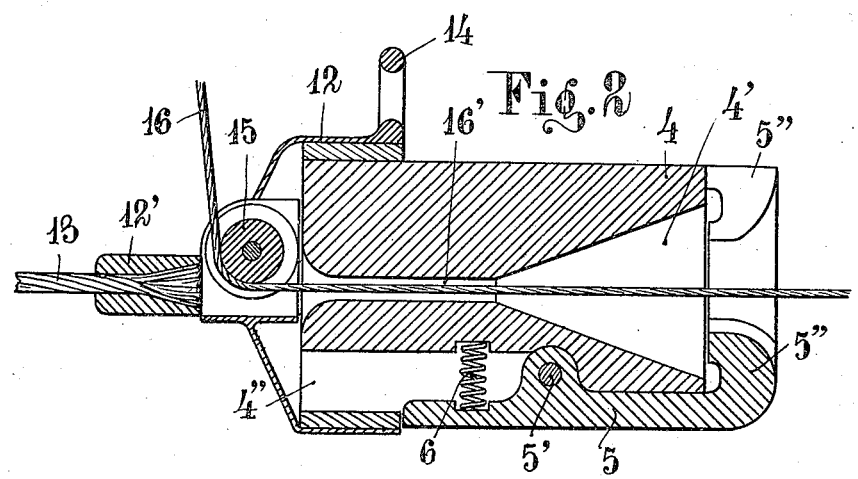
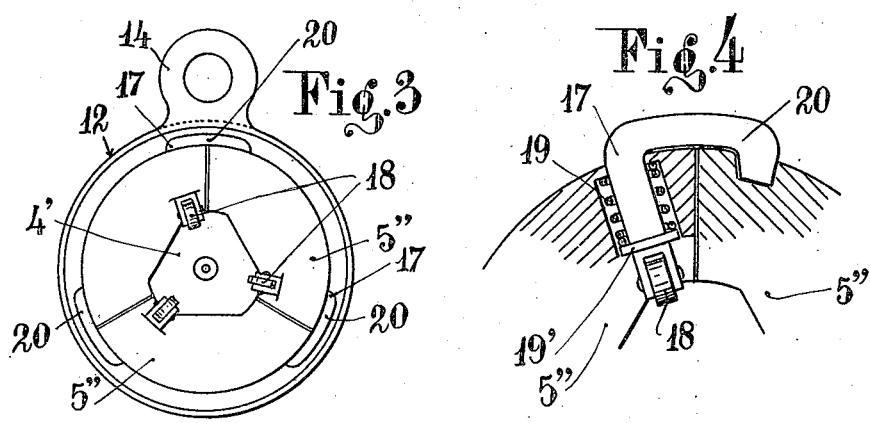
Inventor:
Donato Gariglio
By Emil Börnelyche
Attorney

UNITED STATES PATENT OFFICE.

DONATO GARIGLIO, OF TURIN, ITALY.

AUTOMATIC COUPLING FOR ROPES, CABLES, AND THE LIKE.

1,426,563.     Specification of Letters Patent.     Patented Aug. 22, 1922.

Application filed August 23, 1921. Serial No. 494,514.

*To all whom it may concern:*

Be it known that I, DONATO GARIGLIO, subject of the King of Italy, residing at Turin, Italy, have invented certain new and useful Improvements in Automatic Couplings for Ropes, Cables, and the like, of which the following is a specification.

This invention relates to the automatic couplers for ropes, cables and the like, and has for its object a construction of coupler which is particularly useful in connection with the formation of loops and nets for hitching purposes in lifting sunk boats. The object of the invention will be hereinafter described with reference to this use, but of course it may be used for any other purpose.

The device according to this invention comprises: a female member having an expansible mouth and provided with means for holding it in any desired horizontal or inclined position as well as with means for fastening to it a connecting means secured to a male member hereinafter described; a male member adapted to engage said female member, and means for opening said expansible mouth only when it is acted on by the male member of the device.

The annexed drawing shows by way of example an embodiment of the present invention; in said drawing, Figure 1 is a diagrammatic view showing the two members of the device removed from each other in a position preparatory to their interengagement for producing a close loop by means of a cable having its ends fastened to said members; Figure 2 is the central section of the female member of the device; Figure 3 is the front view of the mouth of said female member; and Figure 4 is a fragmentary section on an enlarged scale showing in detail the parts interlocking the several female hook levers.

As shown by Figure 1, the device comprises a female member 4 having an expansible mouth 5″ and a conical male member 1, these members being fastened to the ends of a cable or rope to be coupled together. Of course the two members of the device can also be attached to independent pieces of rope or cable and then they may serve to couple said pieces for obtaining a longer cable or rope.

Said female member (see Figure 2) comprises a sleeve 4 providing a conical recess or seat 4′, and a number of hook-levers 5 pivoted by pins 5′ in recesses 4″ provided in said sleeve 4. The springs 6 located between the tail of the hook levers 5 and the sleeve 4 provide for holding the said levers 5 with their hooks 5″ in closed position in front of the mouth 4′, as shown by Figures 2 and 3.

Said sleeve 4 is also provided with a head 12 carrying a socket 12′ to which is fastened one end of the rope or cable 13 whose opposite end is fastened to the male member 1 (see Figures 1 and 2).

The head 12 is provided with an eye 14 for hanging or suspending the device from a boat or the like; this eye is preferably arranged in a transverse plane passing through the barycentre of the member or more or less spaced apart from it according to the axis of said female member is to be held horizontal or more or less inclined to the horizontal.

On said head 12 is finally pivoted a grooved roller 15 having the bottom of its groove tangent to the wall of the central hole 16′ of the sleeve 4 through which passes a cord 16 which has one end fastened to the point of the male member 1 and the other end free for manipulation by the operators from a boat or the like.

Said roller 15 is preferably pivoted around an axis which is horizontal when the eye 14 is at the top of the device, as shown by Figure 2.

The operation of the device is as follows: By assuming that the female member 4 is hung by means of the eye 14 in the position shown by Figure 1 and that the cord 16 is controlled by an operator, when the rope or cable 13 is to be closed into a loop, the operator pulls on the cord 16 to carry the male member 1 into engagement with the hooks 5″ of levers 5. The pull exerted by the cord 16 causes the male member 1 to move out the hooks 5″ against the action of the springs 6 and to enter the conical seat 4′; when the male member 1 has fully entered said seat 4′ the hooks 5″ are brought in again by the springs 6 to engage the rear edge of the male member, and thus the coupling members are safely interengaged.

During the described manipulations the cord 16 may come to bear on either of the hooks 5″ and it may cause the associate hook and lever 5—5″ to take up an open position. This would be a very objectionable matter because the male member when approaching the female one would be moved from its position concentric with said female member and this would interfere with a satisfactory operation of the device.

For avoiding the drawback above referred to this invention provides members locking the several hook levers with each other, and parts releasing said locking members only when an even and uniform pressure is being exerted at the same time on the several hook levers and associate parts.

This arrangement is shown by Figures 3 and 4. It comprises a pin 17 mounted to slide radially in each hook 5″ and having a roller 18 adapted to be engaged by the surface of the male member of the coupling. Said pin has an upturned portion which ends in a tooth 20 entering a suitable recess of the adjacent hook 5″. A spring 19, located between a flange 19′ of the pin 17 and the bottom of the recess provided in the hook for the location of this pin, holds the tooth 20 in engaged position and thereby all the hooks are clamped in position unless all the rollers 18 are acted on at the same time by the male member of the device.

It is to be understood that a number of changes and modifications may be made in the subject matter of the present invention without coming out of the spirit thereof, the invention being only defined by the appended claims.

What I claim as my invention and desire to secure by United States Letters Patent is:

1. A coupling for connecting the ends of ropes, cables and the like comprising a female member to which is connected one of said ends, a male member to which is connected another of said ends, said female member comprising a seat for receiving said male member, spring hooks for clamping said male member in position in said seat, said spring hooks being opened by their cooperation with an inclined portion of said male member, and means for pulling said male member toward and into engagement with said female member.

2. A coupling for connecting the ends of ropes, cables and the like, comprising a female member including a sleeve with an enlarged seat, means for hanging said sleeve in a desired position, means for connecting to said sleeve one of said ends, hook levers pivoted on said sleeve with their hooks projecting at the mouth of said seat, springs holding said hooks in projecting position, a male member to which is connected another of said ends, a roller pivoted on said sleeve on an axis transverse to the line of hanging of said sleeve, said roller having a groove tangent to the central passage of said sleeve, and a connecting means passing on said roller and through said passage and attached to said male member for pulling it toward and into engagement with said sleeve and seat.

3. A coupling for connecting ends of ropes, cables and the like, comprising a female member to which is connected one of said ends, a male member to which is connected another of said ends, said female member comprising a seat for receiving said male member, spring hooks clamping said male member in said seat, said spring hooks being opened by their cooperation with an inclined portion of said male member, means for pulling said male member toward and into engagement with said female member and means in said hooks interlocking them together, said means being released by the cooperation of said male member with all said hooks at the same time.

4. A coupling for connecting the ends of ropes, cables and the like, comprising a female member to which is connected one of said ends, a male member to which is connected another of said ends, said female member comprising a seat for receiving said male member, spring hooks for clamping said male member in position in said seat, said spring hooks being opened by their cooperation with an inclined portion of said male member, means for pulling said male member toward and into engagement with said female member, a part mounted in each hook, this part having means removably engaging the adjacent hook and means projecting into the path of said male member when opening said hooks and entering said seat, for the purpose of interlocking said hooks and of releasing them when said male member cooperates with all said hooks at the same time.

In testimony whereof I affix my signature.

DONATO GARIGLIO.